(12) United States Patent
Thomas, Sr.

(10) Patent No.: US 11,753,161 B2
(45) Date of Patent: Sep. 12, 2023

(54) BUOYANCY AND IMPACT RECOVERY SYSTEM

(71) Applicant: Tony Wayne Thomas, Sr., Bend, OR (US)

(72) Inventor: Tony Wayne Thomas, Sr., Bend, OR (US)

( * ) Notice: Subject to any disclaimer, the term of this patent is extended or adjusted under 35 U.S.C. 154(b) by 119 days.

(21) Appl. No.: 17/588,203

(22) Filed: Jan. 28, 2022

(65) Prior Publication Data
US 2023/0242249 A1    Aug. 3, 2023

(51) Int. Cl.
*B64C 39/02* (2023.01)
*B64U 10/13* (2023.01)

(52) U.S. Cl.
CPC .......... *B64C 39/024* (2013.01); *B64U 10/13* (2023.01); *B64U 2201/104* (2023.01)

(58) Field of Classification Search
CPC ........ B64U 70/83; B64U 70/87; B64C 25/56; B64C 27/006; B64C 99/00
USPC ......................................................... 244/107
See application file for complete search history.

(56) References Cited

U.S. PATENT DOCUMENTS

| | | | |
|---|---|---|---|
| 1,818,597 A * | 8/1931 | Adams | B64C 25/56 244/107 |
| 3,091,782 A * | 6/1963 | Sclafani | B64C 25/52 244/101 |
| 4,382,567 A * | 5/1983 | Fredericks | B64C 25/56 244/107 |
| 7,309,267 B1 * | 12/2007 | Henry | B64C 25/56 441/40 |
| 8,979,023 B1 * | 3/2015 | Wang | B64C 39/024 244/100 A |
| 10,099,786 B1 * | 10/2018 | Bar-Zeev | B64D 1/14 |
| 11,260,982 B2 * | 3/2022 | Smith | B64D 25/00 |
| 11,524,772 B1 * | 12/2022 | Cecil | B64C 25/56 |
| 2011/0276232 A1 * | 11/2011 | Filias | B64C 25/56 701/45 |
| 2014/0319265 A1 * | 10/2014 | Cacciaguerra | B64C 27/22 244/6 |
| 2017/0253325 A1 * | 9/2017 | Zou | B64C 27/08 |
| 2017/0327208 A1 * | 11/2017 | Delorme | B64C 25/56 |
| 2019/0202570 A1 * | 7/2019 | Smith | B64D 45/00 |
| 2021/0053691 A1 * | 2/2021 | Goto | B64D 25/00 |
| 2021/0237868 A1 * | 8/2021 | Yamato | B64D 17/80 |
| 2023/0150625 A1 * | 5/2023 | Moses | B63C 9/22 244/17.23 |

FOREIGN PATENT DOCUMENTS

| | | | | |
|---|---|---|---|---|
| AU | 2012220372 B2 * | 1/2017 | ............ | B64C 25/56 |
| CA | 2972697 A1 * | 9/2017 | ............ | B64C 25/56 |

(Continued)

*Primary Examiner* — Christopher P Ellis
(74) *Attorney, Agent, or Firm* — Cognition IP, P.C.; Edward Steakley; Schiller Hill

(57) ABSTRACT

Methods, systems and apparatus for the deploying of buoyancy and impact reduction measures during operation of a UAV in the event of a failure, malfunction or collision. One or more airbags or bladders may be inflated to reduce the force transferred to the UAV as a result of a crash or collision. The bladders may both be used in the impact reduction as well as being used as a floatation device in the event a water landing/crash. The airbags may be configured to keep the UAV afloat so as to allow for the recovery of the UAV.

20 Claims, 4 Drawing Sheets

(56) References Cited

FOREIGN PATENT DOCUMENTS

| | | | | |
|---|---|---|---|---|
| CN | 110758747 | A * | 2/2020 | |
| CN | 113264192 | A * | 8/2021 | |
| CN | 115320867 | A * | 11/2022 | |
| CN | 218806724 | U * | 4/2023 | |
| DE | 102013102869 | A1 * | 9/2014 | ........... B64C 27/006 |
| EP | 3744639 | B1 * | 3/2023 | ........... B64C 39/024 |
| GB | 2457719 | A * | 8/2009 | ............. B64C 25/56 |
| WO | WO-2022072551 | A1 * | 4/2022 | |

* cited by examiner

BUOYANCY AND IMPACT RECOVERY SYSTEM

FIELD

The present invention relates generally to the prevention of damage and the safe recovery of UAVs that have been involved in an impact with a structure/object or malfunction during flight.

BACKGROUND

Unmanned Aerial Vehicles (UAVs) are becoming more common in all sectors of industry. Surveillance, monitoring/inspection, package delivery and entertainment have all seen an increase in the use of UAVs. UAVs are susceptible to malfunctions and failure of components, errors in navigation and environmental hazards. In the course of performing duties, UAVs may become damaged or be completely lost. A need to limit the damage to UAVs in the event of failure is needed. In operations that are performed over bodies of water, a failure usually results in a complete loss of the UAV.

SUMMARY

The systems and methods described herein provide for the operation of a buoyancy and impact recovery system (BIRS) attached to an unmanned aerial vehicle (UAV). The BIRS system may comprise a communication module, one or more sensor modules, a controlled descent module and one or more inflatable bladders. The one or more inflatable bladders may be stored in an uninflated arrangement within a manifold of the BIRS system.

In some embodiments, the BIRS system may be configured to receive, from the one or more sensors, sensor data relating to the operating conditions of the UAV and the environment in which the UAV is operating. For example, the one or more sensors may comprise camera sensors, infrared sensors, depth sensors, ultrasound sensors, infrasound sensors, LiDAR sensors, RADAR sensors or combination thereof. The BIRS system may then identify, based at least in part on the received sensor data, one or more threats to the UAV.

In some embodiments, the system may be configured to initiate, based at least in part on the identifying of the threats and received sensor data, one or more mitigation procedures. The mitigation procedures may comprise a controlled descent process and an impact reduction process. The controlled descent process may be configured to reduce a rate of descent of the UAV. This may be accomplished by controlling one or more rotors to establish an autorotation descent, deploying one or more parachutes or combination thereof. The impact reduction process may be configured to inflate one or more of inflatable bladders based at least in part on the threats identified.

In some embodiments, the system may further be configured to transmit, by the communication module, a distress signal indicating an incident type, a position of the UAV when the controlled descent processes were initiated, current position of the UAV and the status of the UAV and system. The transmission may be transmitted before or after the mitigation procedure has been completed and the UAV has either recovered, impacted the ground or impacted a body of water. In some embodiments, the transmission may be transmitted both before and after the completion of the mitigation procedures as well as provide real-time information to a server, client, dispatch center of application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure

BRIEF DESCRIPTION OF THE DRAWINGS

The present disclosure will become better understood from the detailed description and the drawings, wherein.

DETAILED DESCRIPTION

Figure 1:
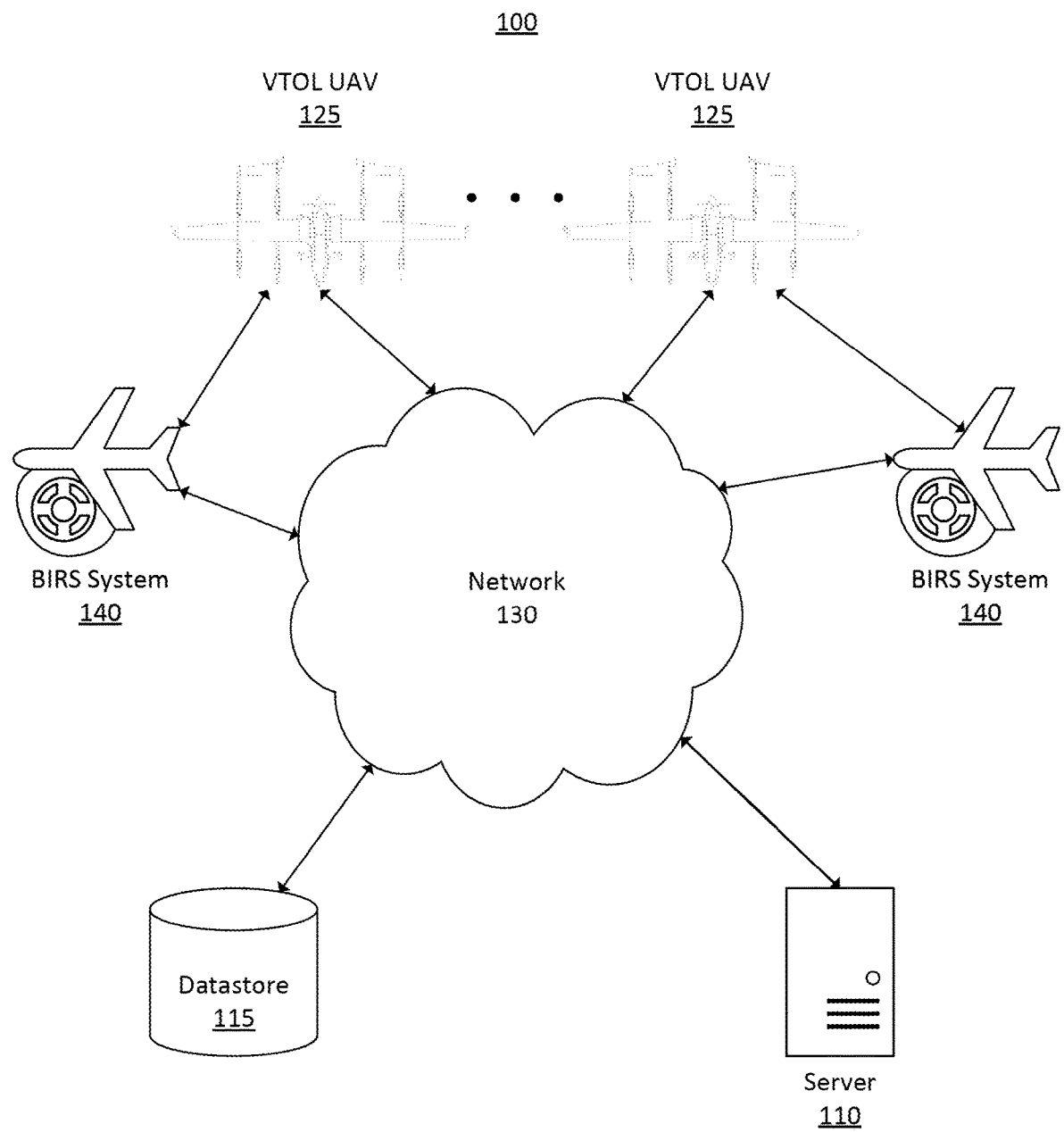
FIG. 1 is a diagram illustrating an exemplary buoyancy and impact recovery platform in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system and methods for the protection and recovery of UAVs that have failed over a body of water. In some embodiments, a UAV may be fitted with one or more buoyancy and impact recovery system ("BIRS") module. BIRS modules may be integrated into the frame of the UAV or attached as modular units. In some embodiments, BIRS modules may comprise one or more inflation units configured to be deployed during failure of the UAV. The one or more inflation units may comprise bags, balloons, bladders or other components capable being inflated and holding air. In some embodiments, the inflation unit may be configured to use an expanding foam to provide impact reduction and buoyancy. The deployment may be initiated by a servo, pneumatic actuator, contact with water or combination thereof. The activation of the BIRS modules and inflation of the one or more bags may provide the UAV with sufficient buoyancy to remain above the surface of the water, allowing for later recovery of the UAV.

In some embodiments, the inflated flotation structure may be positioned such that some or all of the UAV remains above the surface of the water. The flotation structure may be configured to shield sensitive equipment and electronics from water damage by ensuring that the sensitive equipment and electronics never become submerged and that water from waves and spray are diverted away from them.

In some embodiments, the BIRS module may be used as an impact protection system when being operated over land. During failure, malfunction or collision, the BIRS module may be deployed to lessen the impact between the UAV and the ground or structured. The BIRS module may be used as an airbag to reduce the impact force transferred to the UAV. In some embodiments, BIRS module deployment may be used to reduce damage to structures and property as a preventative measure. For example, if a UAV loses control or is blown towards a structure or piece of property, the airbags may be deployed to protect the structure/property from damage.

In some embodiments, the BIRS module may comprise a floatation device, a compressed air unit (i.e. CO2 cartridge), high pressure tubing, one or more manifolds and one or more bags, balloons or bladders. In some embodiments, the BIRS module may further comprise a GPS module, one or more sensors and a battery module.

In some embodiments, the BIRS module may be configured to identify one or more threats near the UAV. Identification may be based at least in part on information received from the one or more sensors. In some embodiments, the BIRS module may detect unusual or dangerous maneuvering by the UAV and make a determination, independent of the flight control system operating the UAV, that a malfunction, failure or impact are imminent. The BIRS module may then initiate one or more mitigation procedures to protect the UAV. The BIRS module may communicate the decision and initiation of the one or more mitigation procedures to the flight control system of the UAV. In some embodiments, sensor data and other information collected or generated by the BIRS module may also be transferred to the UAV. In some embodiments, the mitigation procedures may include the coordinating of the UAV flight control system and the BIRS module to anticipate and react to the detected threat.

In some embodiments, the inflation of the one or more bladders may be triggered mechanically. For example, in the case of a failure over water and a water landing, a bobbin within the BIRS module may dissolve causing the release of a spring loaded pin. The spring loaded pin may puncture a CO2 cartridge, releasing air into the one or more bladders.

In some embodiments, the BIRS modules may be installed on both a UAV and the cargo being transported by the UAV. In some embodiments, cargo may be transported in modules that may be attached and released from the UAV. In regular operation, the attaching of the cargo module would be performed, on the ground, at a distribution center, and the release of the cargo module would be performed, on the ground, upon reaching a target destination. In some embodiments, cargo modules may be released as part of a mitigation procedure. For example, in order to shed weight to avoid crashing, one or more cargo modules may be released. The BIRS modules on the one or more cargo modules may then initiate separate mitigation procedures from that of the UAV (and each other) to protect the cargo module based on each cargo modules individual needs and circumstances (sensor readings).

FIG. 1 is a diagram illustrating an exemplary buoyancy and impact recovery platform 100, in which some embodiments may operate. The buoyancy and impact recovery platform 100 may comprise one or more servers 110, one or more datastores 115, one or more VTOL UAVs 125, one or more networks 130 and one or more BIRS systems 140.

Server 110 may be one or more physical or virtual machines configured to communicate with the one or more datastores 115, VTOL UAVs 125 and BIRS systems 140. The one or more servers may be configured as a distributed computing infrastructure and processing of applications and other software may be carried out on the cloud.

Datastores 115 may communicate with one another over network 130. Datastores 115 may be any storage device capable of storing data for processing or as a result of processing information at the server 110, VTOL UAV 125 or BIRS system 140. The datastores 115 may be a separate device or the same device as server 110. The datastore 115 may be located in the same location as that of server 110, or at separate locations.

Network 130 may be an intranet, internet, mesh, LTE, GSM, peer-to-peer or other communication network that allows the one or more servers 110 to communicate with the one or more datastores 115, VTOL UAVs 125 or BIRS systems 140.

Figure 2:
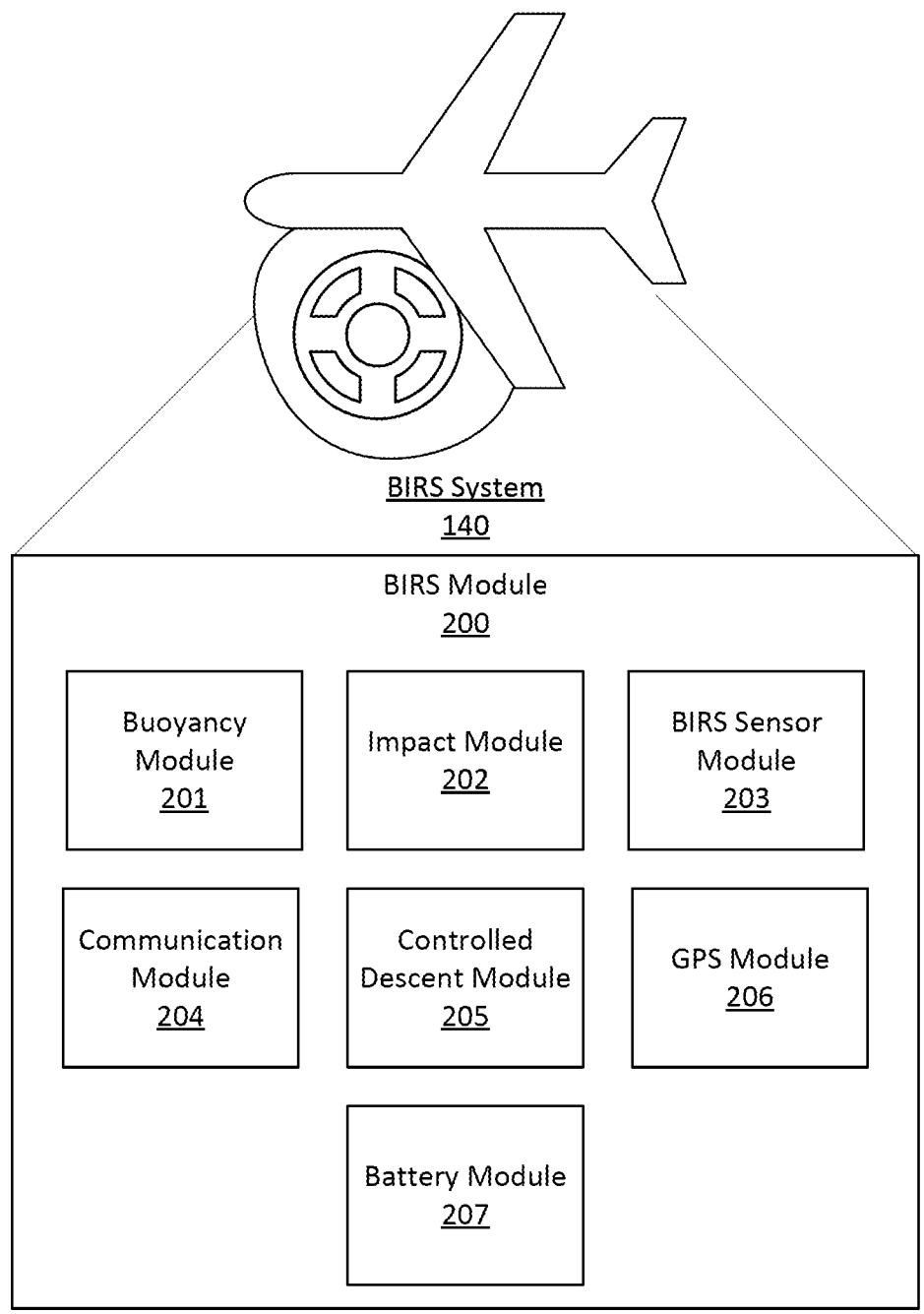
FIG. 2 is a diagram illustrating an exemplary buoyancy and impact recovery system in accordance with aspects of the present disclosure.

FIG. 2 is a diagram illustrating an exemplary BIRS system 140 in accordance with aspects of the present disclosure. BIRS system 140 may comprise a BIRS module 200, buoyancy module 201, impact module 202, BIRS sensor module 203, communication module 204, controlled descent module 205, GPS module 206 and battery module 207.

Buoyancy module 201 may comprise one or more inflatable bladders or airbags, one or more compressed air units (i.e. CO2 cartridge), high pressure tubing, one or more manifolds and one or more deployment mechanisms. In some embodiments, the actuators may be hydraulic, pneumatic or electric. In some embodiments one or more actuators may be mechanically triggered automatically through physical impact of interactions of the system with water. For example, in the case of a water landing, a bobbin within the BIRS module may dissolve causing the release of a spring loaded pin. The spring loaded pin may puncture a CO2 cartridge, releasing air into the one or more bladders.

Impact module 202 may be the same or similar to that of the buoyancy module 201, but operated differently and for a different purpose. In some embodiments, the bladders, compressed air units, tubing, manifolds and deployment mechanisms controlled and or used by the impact module 202 may be the exact same as the ones controlled and/or used by the buoyancy module 201. Each module may control individual components independently of one another and as a result of different inputs, sensor readings, and analysis of data. For example, the impact module 202 may determine which bladders of the one or more bladders to inflate based on a predicted collision path, collision time and orientation of the UAV at the time of the predicted collision. Bladders at or near the point of impact may be controlled to inflate to reduce the forces transferred to the UAV and limit the amount of damage to the UAV as well as the structure collided with.

BIRS sensor module 203 may comprise the one or more sensors such as camera sensors, infrared sensors, depth sensors, ultrasound sensors, infrasound sensors, LiDAR sensors, RADAR sensors or combination thereof. Information collected from the one or more sensors may be used by the BIRS module 200, buoyancy module 201, impact module 202, communication module 204 and controlled descent module 205.

Communication module 204 may comprise one or more receiver units, transmitter units, transceiver units or other communication units configured to communicate wirelessly. In some embodiments, the communication module 204 may comprise units for LTE, GSM, HSPA+, Sub 1 GHz, Bluetooth, Bluetooth low energy, LORAWAN, LPWAN or WIFI (802.11abgn or other WIFI standards) communication and their associated hardware and software. Other communications standards and protocols and their respective communication units (hardware and software) may be used as well, either by themselves or in combination with each other and those listed above. In some embodiments, multiple communication units may be used, either concurrently/in parallel or at separate times. Each communication unit may be used for specific tasks or subtasks. In some embodiments, LTE/GSM or other mobile telecommunication units may be used to coordinate with server 110 over network 130, while other shorter range communication units may be used to communicate directly with VTOL UAVs 125.

Controlled descent module 205 may be configured to reduce a rate of descent of the UAV. This may be accomplished by controlling one or more rotors of the UAV to establish an autorotation descent. In some embodiments, the controlled descent module 205 may comprise one or more parachutes, wherein the one or more parachutes may be deployed in the event of a failure, malfunction or collision of the UAV.

GPS module 206 may be any hardware, software or combination thereof with the capability of determining the coordinates of the unit with respect to the earth.

Battery module 207 may be any device configured to store electrical energy. The battery module 207 may provide the electricity needed to perform all operations and computations of the BIRS system. In some embodiments, the battery module 207 may also comprise electrical generation means, other than chemical reactions. For example, small internal combustion generators or kinetic energy sources such as flywheel energy storage systems. The battery module 207 may be separate from the battery module and electrical systems of the UAV. This may allow the BIRS system 140 to operate after the UAV battery has been depleted or UAV electrical system has been damaged.

Figure 3:
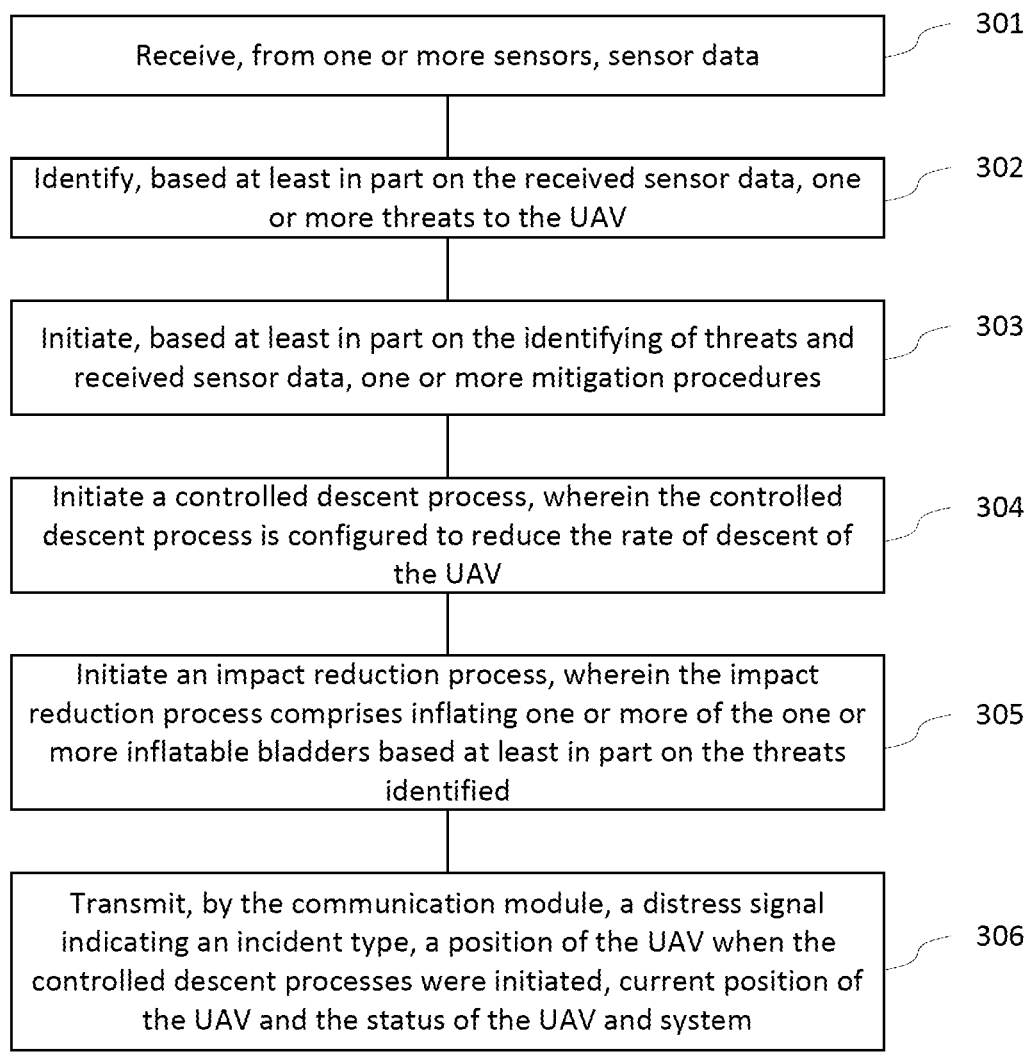
FIG. 3 is a flow chart illustrating an exemplary method that may be performed in accordance with some embodiments.

FIG. 3 is a flow chart illustrating an exemplary method 300A that may be performed in accordance with some embodiments.

At step 301, the system is configured to receive, from the one or more sensors, sensor data.

At step 302, the system is configured to identify, based at least in part on the received sensor data, one or more threats to the UAV. In some embodiments, identification of threats may be based on analysis of the sensor data by one or more trained machine learning modules. In some embodiments, computer vision models may be used both identify, classify and track objects within a predefined area surrounding the UAV. In some embodiments, one or more inertial measurement units may be used to determine malfunction and failures of rotors or other critical components of the UAV. For, example, vibrations, changes in altitude, changes in bearing or other flight characteristics may be detected and determined to be a possible rotor or motor issue. A damaged rotor may result in vibrations before complete failure occurs. The sensor readings may be logged and stored for analysis during or after the flight. In some embodiments, real time data from one or more inertial measurement units may be analyzed by one or more machine learning modules to monitor the health of critical components of the UAV. Changes to the operation of one or more critical components may then be determined before a complete failure of the component has occurred. The machine learning models may be used to predict time to failure of a component as well as likelihood of failure.

At step 303, the system is configured to initiate, based at least in part on the identifying of the threats and received sensor data, one or more mitigation procedures, wherein the mitigation procedures comprise.

At step 304, the system is configured to initiate a controlled descent process, wherein the controlled descent process is configured to reduce the rate of descent of the UA.

At step 305, the system is configured to initiate an impact reduction process, wherein the impact reduction process comprises inflating one or more of the one or more inflatable bladders based at least in part on the threats identified.

At step 306, the system is configured to transmit, by the communication module, a distress signal indicating an incident type, a position of the UAV when the controlled descent processes were initiated, current position of the UAV and the status of the UAV and system.

Figure 4:
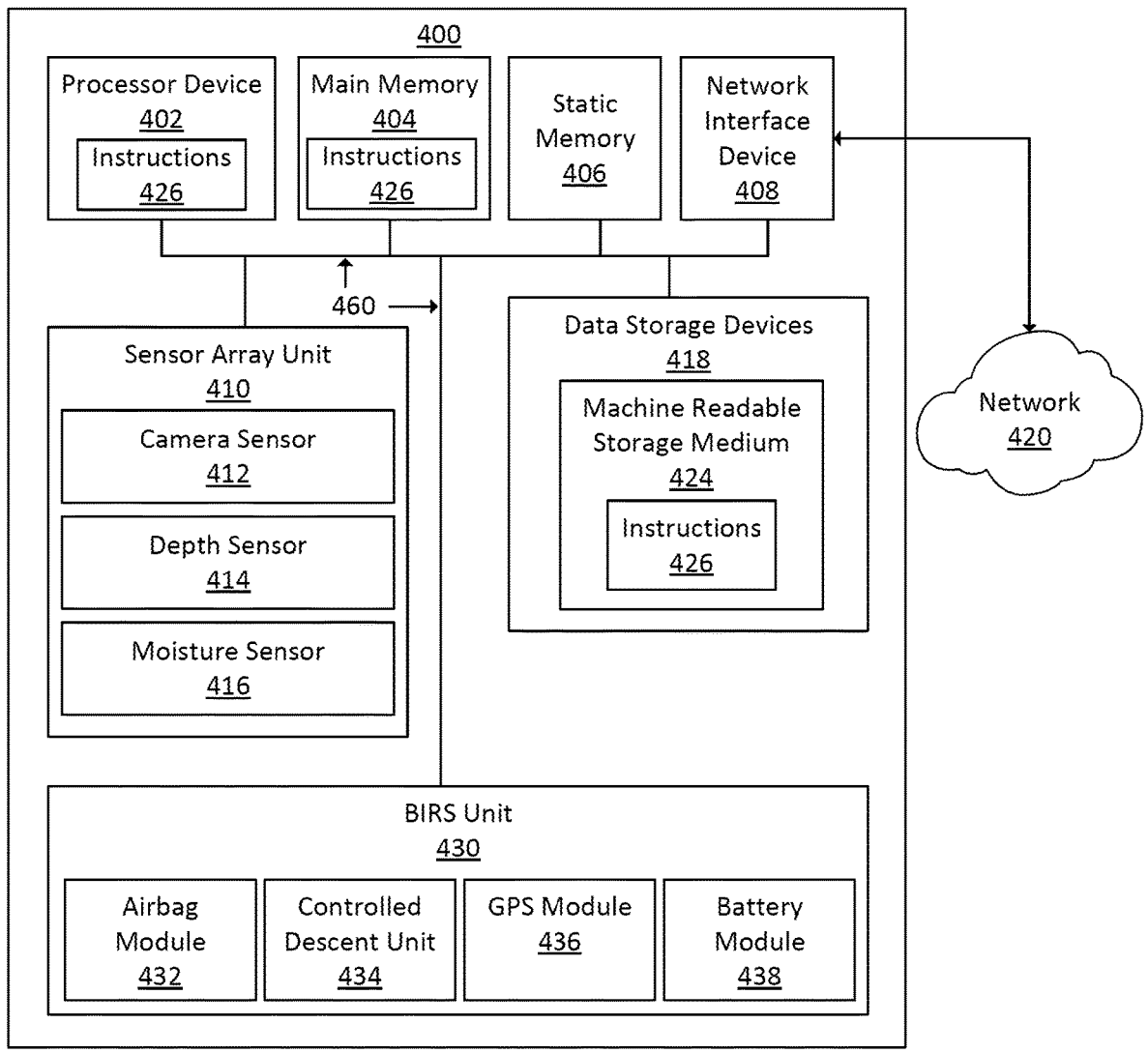
FIG. 4 is a diagram illustrating an exemplary computer/control system that may perform processing in some embodiments and in accordance with aspects of the present disclosure.

FIG. 4 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 460.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420. The computer system 400 also may include sensor array unit 410. Sensor array 410 may comprise a camera sensor 412, depth sensor 414 and moisture sensor 416. In some embodiments, one or more sensors of the sensor array unit 410 may be removed or replaced with another sensor. Sensors may also be added to the sensor array.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In one implementation, the instructions 426 include instructions to implement functionality corresponding to the components of a device to perform the disclosure herein. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

The BIRS unit 430 may comprise airbag unit 432, controlled descent unit 434, GPS module 436 and battery module 438. Airbag unit 432 may be the same or similar to buoyancy module 201 and/or impact module 202 in FIG. 2. Controlled descent unit 434 may be the same or similar to the controlled descent module 205 in FIG. 2. GPS module 436 may be the same or similar to GPS module 206 in FIG. 2. Battery module 438 may be the same or similar to the battery module 207 in FIG. 2.

It will be appreciated that the present disclosure may include any one and up to all of the following examples.

Example 1: A buoyancy and impact recovery system attached to an unmanned aerial vehicle (UAV), the system comprising: a communication module; a battery module; a global positioning module (GPS); one or more sensor modules; a controlled descent module; and one or more inflatable bladders, wherein the one or more inflatable bladders are stored in an uninflated arrangement; and wherein the system is configured to: receive, from the one or more sensors, sensor data; identify, based at least in part on the received sensor data, one or more threats to the UAV; initiate, based at least in part on the identifying of the threats and received sensor data, one or more mitigation procedures, wherein the mitigation procedures comprise: a controlled descent process, wherein the controlled descent process is configured to reduce a rate of descent of the UAV; and an impact reduction process, wherein the impact reduction process comprises inflating one or more of the one or more inflatable bladders based at least in part on the threats identified; transmit, by the communication module, a distress signal indicating an incident type, a position of the UAV when the controlled descent process was initiated, current position of the UAV and the status of the UAV and system.

Example 2: The system of Example 1, wherein the controlled descent module comprises a parachute.

Example 3: The system of Example 1, wherein the controlled descent module is configured to control one or more rotors, wherein the controlling of the one or more rotors establishes an autorotation descent.

Example 4: The system of Example 1, wherein the one or more threats are determined to be structures.

Example 5: The system of Example 1, wherein the one or more threats are determined to be a malfunction or failure of one or more rotors.

Example 6: The system of Example 1, wherein identification of the one or more threats comprises: aggregating the received sensor data; analyzing, by one or more machine learning models, the aggregated data; classifying one or more possible threats; determining a threat level of each of the one or more possible threats; and tracking the one or more possible threats when their corresponding threat level is above a first predetermined threshold; and wherein the one or more mitigation procedures are initiated when the threat level of one or more possible threats is above a second predetermined threshold.

Example 7: The system of Example 6, wherein the aggregated data comprises image data received from one or more camera sensors.

Example 8: The system of Example 7, wherein the one or more machine learning models are computer vision models and the threats identified are visual threats; and wherein the tracking comprises maintaining a current record of a position, orientation and distance of a visual threat.

Example 9: The system of Example 6, wherein the aggregated data comprises inertial measurement unit data.

Example 10: The system of Example 9, wherein the one or more machine learning models are configured to predict component health for one or more critical components of the UAV and the threats identified are component failure threats; and wherein determining a threat level for component failure threats comprises predicting a time to failure for critical components associated with the component failure threats.

Example 11: A computer implemented method for initiating a buoyancy and impact recovery procedure of one or more buoyancy and impact recovery systems attached to an unmanned aerial vehicle (UAV), the method comprising: receiving, from the one or more sensors, sensor data; identifying, based at least in part on the received sensor data, one or more threats to the UAV; initiating, based at least in part on the identifying of the threats and received sensor data, one or more mitigation procedures, wherein the mitigation procedures comprise: a controlled descent process, performed by a controlled descent module, wherein the controlled descent process is configured to reduce a rate of descent of the UAV; and an impact reduction process, wherein the impact reduction process comprises inflating, one or more inflatable bladders housed within the system, based at least in part on the threats identified; and transmitting, by a communication module, a distress signal indicating an incident type, a position of the UAV when the controlled descent process was initiated, current position of the UAV and a status of the UAV and system.

Example 12: The method of Example 11, wherein the controlled descent module comprises a parachute.

Example 13: The method of Example 11, wherein the controlled descent module is configured to control one or more rotors, wherein the controlling of the one or more rotors establishes an autorotation descent.

Example 14: The method of Example 11, wherein the one or more threats are determined to be structures.

Example 15: The method of Example 11, wherein the one or more threats are determined to be a malfunction or failure of one or more rotors.

Example 16: The method of Example 11, wherein identification of the one or more threats comprises: aggregating the received sensor data; analyzing, by one or more machine learning models, the aggregated data; classifying one or more possible threats; determining a threat level of each of the one or more possible threats; and tracking the one or more possible threats when their corresponding threat level is above a first predetermined threshold; and wherein the one or more mitigation procedures are initiated when the threat level of one or more possible threats is above a second predetermined threshold.

Example 17: The method of Example 16, wherein the aggregated data comprises image data received from one or more camera sensors.

Example 18: The method of Example 17, wherein the one or more machine learning models are computer vision models and the threats identified are visual threats; and wherein the tracking comprises maintaining a current record of a position, orientation and distance of a visual threat.

Example 19: The method of Example 16, wherein the aggregated data comprises inertial measurement unit data.

Example 20: The method of Example 19, wherein the one or more machine learning models are configured to predict component health for one or more critical components of the UAV and the threats identified are component failure threats; and wherein determining a threat level for component failure threats comprises predicting a time to failure for critical components associated with the component failure threats.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A buoyancy and impact recovery system attached to an unmanned aerial vehicle (UAV), the system comprising:
   a communication module;
   a battery module;
   a global positioning module (GPS);
   one or more sensor modules;
   a controlled descent module; and
   one or more inflatable bladders, wherein the one or more inflatable bladders are stored in an uninflated arrangement; and
   wherein the system is configured to:
      receive, from the one or more sensors, sensor data;
      identify, based at least in part on the received sensor data, one or more threats to the UAV;

initiate, based at least in part on the identifying of the threats and received sensor data, one or more mitigation procedures, wherein the mitigation procedures comprise:
- a controlled descent process, wherein the controlled descent process is configured to reduce a rate of descent of the UAV; and
- an impact reduction process, wherein the impact reduction process comprises inflating one or more of the one or more inflatable bladders based at least in part on the threats identified;

transmit, by the communication module, a distress signal indicating an incident type, a position of the UAV when the controlled descent process was initiated, current position of the UAV and the status of the UAV and system.

2. The system of claim 1, wherein the controlled descent module comprises a parachute.

3. The system of claim 1, wherein the controlled descent module is configured to control one or more rotors, wherein the controlling of the one or more rotors establishes an autorotation descent.

4. The system of claim 1, wherein the one or more threats are determined to be structures.

5. The system of claim 1, wherein the one or more threats are determined to be a malfunction or failure of one or more rotors.

6. The system of claim 1, wherein identification of the one or more threats comprises:
- aggregating the received sensor data;
- analyzing, by one or more machine learning models, the aggregated data;
- classifying one or more possible threats;
- determining a threat level of each of the one or more possible threats; and
- tracking the one or more possible threats when their corresponding threat level is above a first predetermined threshold; and
- wherein the one or more mitigation procedures are initiated when the threat level of one or more possible threats is above a second predetermined threshold.

7. The system of claim 6, wherein the aggregated data comprises image data received from one or more camera sensors.

8. The system of claim 7, wherein the one or more machine learning models are computer vision models and the threats identified are visual threats; and
- wherein the tracking comprises maintaining a current record of a position, orientation and distance of a visual threat.

9. The system of claim 6, wherein the aggregated data comprises inertial measurement unit data.

10. The system of claim 9, wherein the one or more machine learning models are configured to predict component health for one or more critical components of the UAV and the threats identified are component failure threats; and
- wherein determining a threat level for component failure threats comprises predicting a time to failure for critical components associated with the component failure threats.

11. A computer implemented method for initiating a buoyancy and impact recovery procedure of one or more buoyancy and impact recovery systems attached to an unmanned aerial vehicle (UAV), the method comprising:
receiving, from the one or more sensors, sensor data;
identifying, based at least in part on the received sensor data, one or more threats to the UAV;
initiating, based at least in part on the identifying of the threats and received sensor data, one or more mitigation procedures, wherein the mitigation procedures comprise:
- a controlled descent process, performed by a controlled descent module, wherein the controlled descent process is configured to reduce a rate of descent of the UAV; and
- an impact reduction process, wherein the impact reduction process comprises inflating, one or more inflatable bladders housed within the system, based at least in part on the threats identified; and transmitting, by a communication module, a distress signal indicating an incident type, a position of the UAV when the controlled descent process was initiated, current position of the UAV and a status of the UAV and system.

12. The method of claim 11, wherein the controlled descent module comprises a parachute.

13. The method of claim 11, wherein the controlled descent module is configured to control one or more rotors, wherein the controlling of the one or more rotors establishes an autorotation descent.

14. The method of claim 11, wherein the one or more threats are determined to be structures.

15. The method of claim 11, wherein the one or more threats are determined to be a malfunction or failure of one or more rotors.

16. The method of claim 11, wherein identification of the one or more threats comprises:
- aggregating the received sensor data;
- analyzing, by one or more machine learning models, the aggregated data;
- classifying one or more possible threats;
- determining a threat level of each of the one or more possible threats; and
- tracking the one or more possible threats when their corresponding threat level is above a first predetermined threshold; and
wherein the one or more mitigation procedures are initiated when the threat level of one or more possible threats is above a second predetermined threshold.

17. The method of claim 16, wherein the aggregated data comprises image data received from one or more camera sensors.

18. The method of claim 17, wherein the one or more machine learning models are computer vision models and the threats identified are visual threats; and
- wherein the tracking comprises maintaining a current record of a position, orientation and distance of a visual threat.

19. The method of claim 16, wherein the aggregated data comprises inertial measurement unit data.

20. The method of claim 19, wherein the one or more machine learning models are configured to predict component health for one or more critical components of the UAV and the threats identified are component failure threats; and
- wherein determining a threat level for component failure threats comprises predicting a time to failure for critical components associated with the component failure threats.

* * * * *